(12) United States Patent  (10) Patent No.: US 7,768,557 B2
Yamamoto  (45) Date of Patent: Aug. 3, 2010

(54) IMAGE CAPTURING APPARATUS

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 579 days.

(21) Appl. No.: 11/782,248

(22) Filed: Jul. 24, 2007

(65) Prior Publication Data

US 2008/0024625 A1 Jan. 31, 2008

(30) Foreign Application Priority Data

Jul. 26, 2006 (JP) .............................. 2006-202929

(51) Int. Cl.
H04N 5/76 (2006.01)
(52) U.S. Cl. .................................. 348/231.1
(58) Field of Classification Search .............. 348/231.1, 348/231.99, 222.1, 333.02
See application file for complete search history.

(56) References Cited

U.S. PATENT DOCUMENTS

| | | | |
|---|---|---|---|
| 6,118,920 A * | 9/2000 | Sato | 386/46 |
| 2003/0095195 A1 * | 5/2003 | Iwauchi | 348/231.99 |
| 2003/0128763 A1 * | 7/2003 | Funamoto | 375/240.18 |
| 2004/0212693 A1 * | 10/2004 | Wakabayashi | 348/231.1 |
| 2005/0174443 A1 * | 8/2005 | Niimura et al. | 348/231.2 |
| 2006/0001747 A1 | 1/2006 | Yamamoto | |
| 2006/0001929 A1 | 1/2006 | Yamamoto | |
| 2007/0195170 A1 | 8/2007 | Yamamoto et al. | |
| 2007/0196083 A1 | 8/2007 | Yamamoto et al. | |

FOREIGN PATENT DOCUMENTS

JP 2002290779 10/2002
JP 2004193642 A * 7/2004

OTHER PUBLICATIONS

English language Abstract of JP 2002-290779.
U.S. Appl. No. 11/782,226 to Yamamoto, which was filed Jul. 24, 2007.
U.S. Appl. No. 11/782,269 to Yamamoto, which was filed Jul. 24, 2007.

* cited by examiner

*Primary Examiner*—Jason Whipkey
(74) *Attorney, Agent, or Firm*—Greenblum & Bernstein, P.L.C.

(57) ABSTRACT

An image capturing apparatus is provided having an image capturing device, an image compressing device, a recording device, a definition calculating device, and a residual recordable number calculating device. The image capturing device outputs a captured image. The image compressing device compresses the captured image using flexible compression. The recording device records the compressed captured image into a memory medium. The definition calculating device calculates a definition by summing the absolute value of higher frequency components in the compressed captured image before the higher frequency components are rounded off. The residual recordable number calculating device calculates a residual recordable number of images in the memory medium using the definition of a standard image, the file size of a standard image, and a residual recordable amount of the memory medium.

14 Claims, 4 Drawing Sheets

FIG. 3

|    | h₁ | h₂ | h₃ | h₄ | h₅ | h₆ | h₇ | h₈ |    |
|----|----|----|----|----|----|----|----|----|----|
| 28 | 22 | 8  | 2  | 1  | 0  | 1  | 0  |    | v₁ |
| 7  | −6 | −2 | −1 | 1  | 2  | 0  | 0  |    | v₂ |
| −1 | 1  | −2 | 3  | 2  | 1  | 0  | 0  |    | v₃ |
| 3  | −1 | −1 | 2  | −1 | 0  | 2  | 0  |    | v₄ |
| −2 | 1  | −1 | 1  | −1 | 1  | 0  | 0  |    | v₅ |
| 1  | −2 | 0  | −1 | 0  | 0  | 0  | 0  |    | v₆ |
| 1  | 0  | 0  | 0  | 0  | 0  | 0  | 0  |    | v₇ |
| 0  | 0  | 0  | 0  | 0  | 0  | 0  | 0  |    | v₈ |

30

IMAGE CAPTURING APPARATUS

BACKGROUND OF THE INVENTION

1. Field of the Invention

The present invention relates to an image capturing apparatus, and particularly to the prediction of the residual recordable number of images in a storage medium provided in the image capturing apparatus.

2. Description of the Related Art

An image capturing apparatus, e.g. a digital camera, captures an object image through a lens and converts it into image data using a CCD and an AFE. The image data is stored temporarily in a memory which is provided in the digital camera, processed by a DSP, and recorded into an external memory medium as an image file. An LCD automatically or manually displays an image file which is stored in a memory medium, a moving image (a monitor-through image) transmitted from a CCD, and information required for operating the digital camera.

A DSP creates an image file using JPEG compression. JPEG compression is a type of flexible compression which results in image files differing from each other in size.

The concept that the residual recordable amount in a storage medium is divided by a fixed value to predict the residual recordable number of images is disclosed in Japanese Unexamined Patent Publication (KOKAI) No. 2002-290779.

SUMMARY OF THE INVENTION

An object of the present invention is to provide an image capturing apparatus which accurately calculates the residual recordable number of images in a storage medium provided in a digital camera.

An image capturing apparatus is provided having an image capturing device, an image compressing device, a recording device, a definition calculating device, and a residual recordable number calculating device. The image capturing device outputs a captured image. The image compressing device compresses the captured image using flexible compression. The recording device records the compressed captured image into a memory medium. The definition calculating device calculates a definition by summing the absolute value of higher frequency components in the compressed captured image before the higher frequency components are rounded off. The residual recordable number calculating device calculates a residual recordable number of images in the memory medium using the definition of a standard image, the file size of a standard image, and a residual recordable amount of the memory medium.

BRIEF DESCRIPTION OF THE DRAWINGS

The objects and advantages of the present invention will be better understood from the following description, with reference to the accompanying drawings in which:

FIG. 3 shows an example of minimum coded unit; and

DESCRIPTION OF THE PREFERRED EMBODIMENTS

Figure 1:
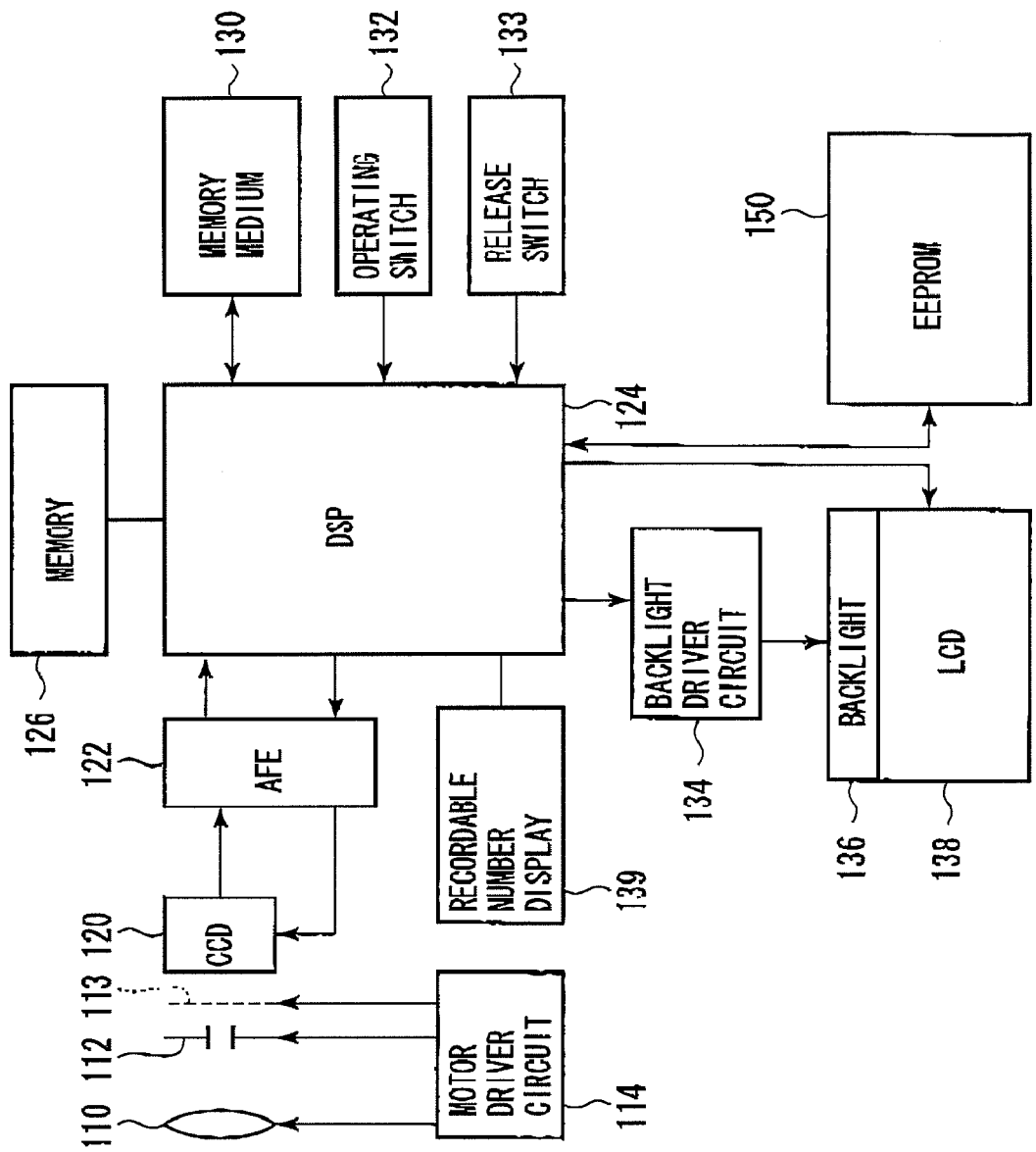
FIG. 1 is a block diagram showing a digital camera as an embodiment of the present invention.

The present invention is described below with reference to the embodiments shown in the drawings.

The constitution of a digital camera having the image capturing apparatus is described with reference to FIG. 1.

A photographing object image is directed to a CCD 120 through a lens 110, an aperture 112, and a shutter 113. The lens 110, aperture 112, shutter 113 are operated by a motor driving circuit 114 according to a control signal from a DSP 124. When the shutter 113 is closed by operating a release switch 133, the CCD 120 converts the photographing object image into electrical signals. An AFE 122 converts electrical signals into image data. The DSP 124 receives image data, stores image data temporarily in a memory 126, and creates an image file by processing and compressing image data. The created image file is recorded into a memory medium 130. An EEPROM 150 stores various data and programs which are required to operate the DSP 124. An operating switch 132 is used for operating the digital camera, e.g. for displaying an image recorded in the memory medium 130.

A backlight driving circuit 134 turns on a backlight provided in a LCD 138 according to a control signal from the DSP 124. The LCD 138 displays a monitor-through image which is created by periodically updating image data received from the DSP 124 before an object is photographed, and displays image files recorded in the memory medium 130 after the object is photographed. Additionally, the LCD 138 can display the residual recordable number of images in the memory medium 130. Further, a recordable number display 139 also displays the residual recordable number of images in the memory medium 130.

Compression is executed using a JPEG compression method. The JPEG compression method comprises a discrete cosine transform (DCT) process, a quantization process, and a Huffman encoding process. The discrete cosine transform process is a kind or orthogonal transform coding. In the discrete cosine transform process and the quantization process, pixel information is unevenly distributed to the lower frequency components, and the higher frequency components are rounded off because higher frequency components occur less in a natural image, i.e. the brightness or color tone in a natural image does not precipitously change. A Huffman encoding process compresses data using event probability of data. Therefore, in the case that the higher frequency components are significantly rounded off, the compression ratio is increased, and the size of a compressed image file is smaller. If the amount of rounded-off higher frequency components is larger, the size of a compressed image file is smaller, but an image in which the brightness or color tones precipitously change is not accurately reproduced. However, in the case that the amount of rounded higher frequency components is small, an image in which the brightness or color tones precipitously change is precisely reproduced.

Figure 2:
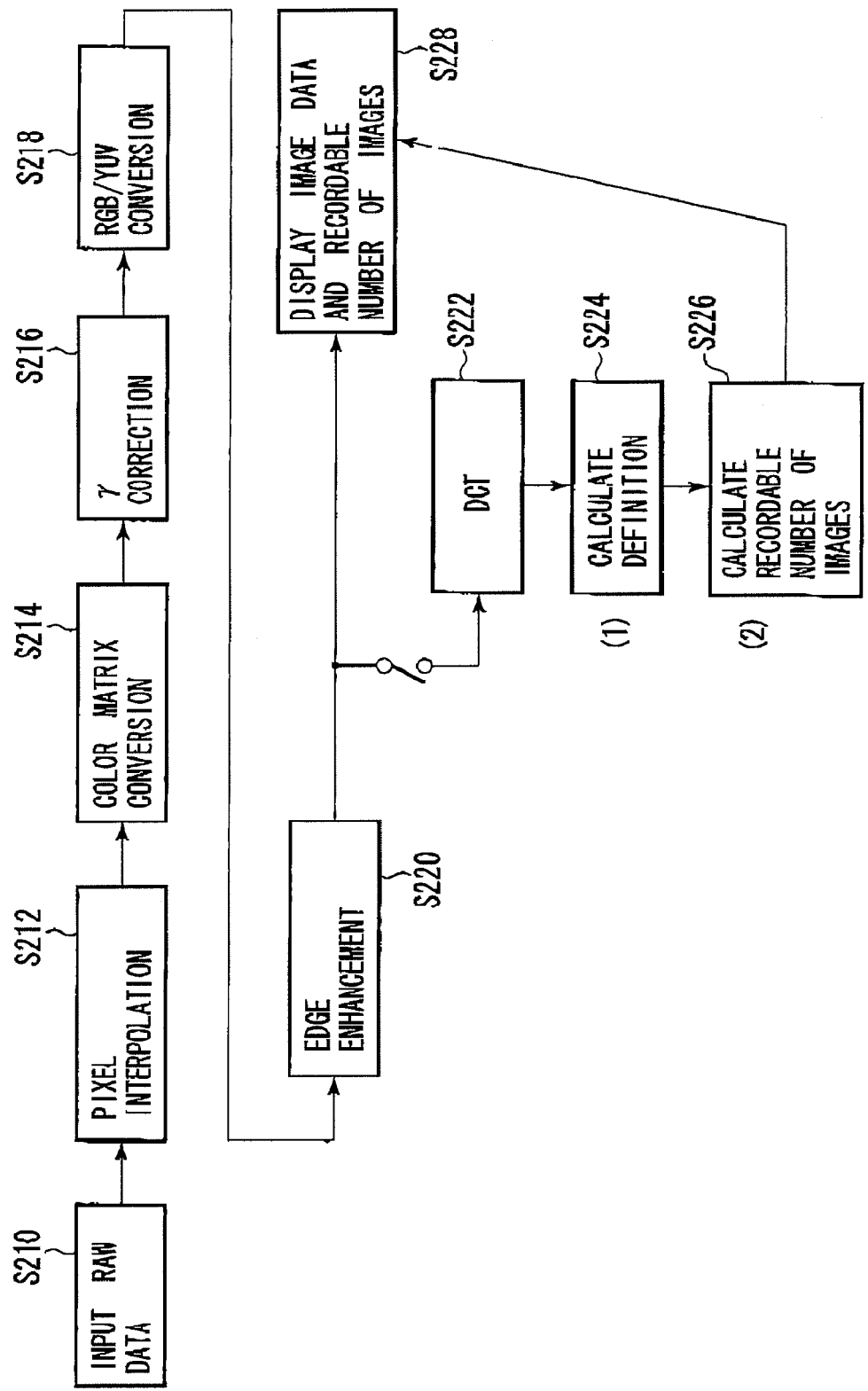
FIG. 2 is a flowchart showing the recordable number calculating process.

FIG. 2 is a flowchart showing the recordable number calculating process executed in the DSP 124.

In step S210, the AFE 122 continuously inputs image data to the DSP 124 as RAW data. RAW data is image data which has not been processed. Image data is processed by a pixel interpolation process in step S212, a color matrix conversion process in step S214, a gamma correction process in step S216, a RGB/YUV conversion process in step S218, an edge enhancement process in step S220, and is output as a captured image. The edge enhancement process is executed for Y-element (luminance signal element). In step S228, the captured image is continuously displayed on the LCD 138, i.e. a monitor-through image is displayed.

A residual recordable number displaying process is described below. In step S222, Y-elements in an image are transformed by a DCT, and quantized. In step S224, the definition DD of an image is calculated using the processed Y-elements. The definition DD is the amount of higher frequency components in an image, calculated by a definition calculating process as described below. The residual recordable number of images is calculated using definition DD in step S226, and displayed on an LCD 138 and/or a recordable number display 139 in step S228. Residual recordable number is calculated and displayed each time an image displayed on an LCD 138 is updated.

The definition calculating process is described below with reference to FIG. 3. The matrix shown in FIG. 3, which is an example of an approximate DCT block, is an example of a minimum coded unit (MCU) which is created from 8×8 Y-component data of pixels.

An approximate DCT block is created by a DCT and quantization in step S222. The components in the proximity of the component at which column h1 and row v1 intersect are named lower frequency components, and those in the proximity of the component at which column h8 and row v8 intersect are named higher frequency components. The definition is a summation of the absolute value of higher frequency components 30 surrounded by broken lines. Higher frequency components 30 are composed of components in columns h7 and h8, rows v7 and v8, the component at which column h5 and row v6 intersect, the component at which column h6 and row v6 intersect, and the component at which column h6 and row v5 intersect. As shown in FIG. 3, the summation of these components is 5(i.e. 0+0+ . . . +0+1+0+ 0+2+0+0+1+0+0+ . . . +0+1+0=5). The summation is calculated for all MCU provided in an image. The definition is calculated by summing all of the summations. A large definition means that many higher frequency components are included in an approximate DCT block. In this case, abrupt color change in an image is able to be reproduced because higher frequency components are not rounded off. Therefore, when the definition is large, changes of brightness or color tone are able to be precisely reproduced.

A residual recordable number calculating process is described below. The residual recordable number Z of images equals a tentative recordable number N of images multiplied by a correction factor C (i.e. Z=B×C). The tentative recordable number of images equals a residual recordable amount of the memory medium 130 divided by the file size of a standard image.

The file size of a standard image is the average of file sizes of various images which are obtained by capturing various photographing objects, and stored in the memory 126 provided in a digital camera.

The correction factor C equals the definition DA of a standard image divided by the definition DD of a captured image. The definition DA of a standard image is the average of the definitions of various images which are obtained by capturing various photographing objects (i.e. C=DA/DD), and stored in the memory 126 provided in a digital camera.

As is well known in the art, the residual recordable number of images equals the residual recordable amount of the memory medium divided by a fixed value. The residual recordable number of images calculated this way differs from the real residual recordable number of images because the size of a captured image varies from image to image. When the residual recordable number of images differs from the real residual recordable number of images, a user must stop photographing even if a remaining recordable capacity of a memory medium is large enough to store another image, and prepare another memory medium. Moreover, the continuous photographing number must be limited when a user continuously takes photographs. However, according to this embodiment, a user can see the high precision residual recordable number Z of images associated with a captured image, and does not have to stop photographing.

Note that, the residual recordable number Z of images may be calculated and displayed only once for a number of times that an image displayed on an LCD 138 is updated. This suppresses the processing power required for calculating the residual recordable number of images, so the DSP 124 is able to assign processing power to other processes, and a user is able to use a digital camera more efficiency.

Figure 4:
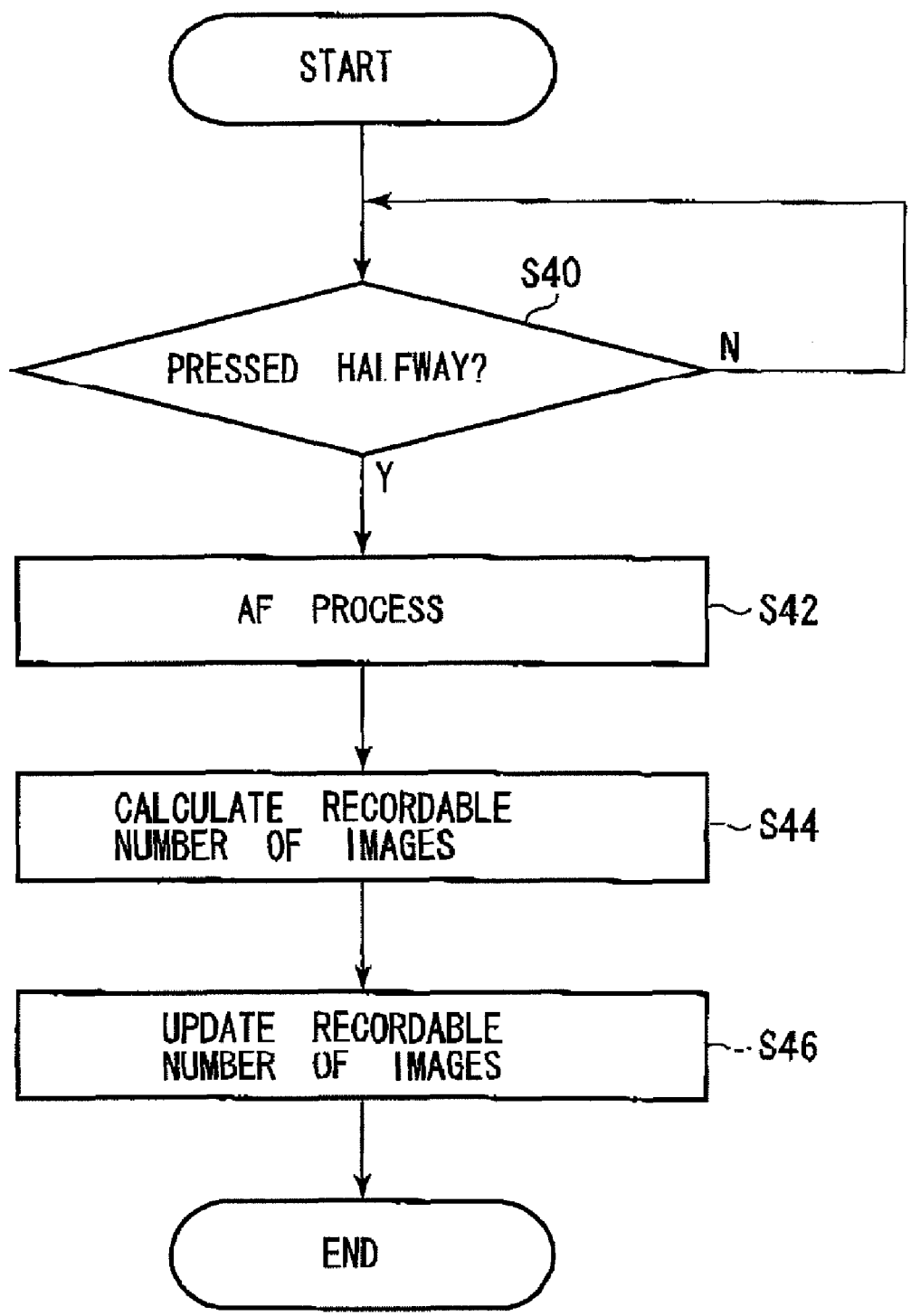
FIG. 4 is a flowchart showing the second embodiment of the present invention.

Another embodiment of the present invention is described below with reference to FIG. 4.

In this embodiment, the residual recordable number of images is calculated according to an image captured when the lens 110 focuses on a photographing object. In step S40, it is judged whether the release switch 133 is pressed halfway or not. In the case that the release switch is pressed halfway, the auto-focus process is executed, i.e. the lens 110 focuses on a photographing object in step S42. After the auto-focus process is executed, the residual recordable number of images is calculated by the residual recordable number calculating process in step S44, and is displayed on the LCD 138 and/or the recordable number display 139 as updated in step S46.

According to this embodiment, a user can be aware of the residual recordable number of images associated with an actual captured image.

Note that, multiplication used in the residual recordable number calculating process may be addition, and division may be subtraction.

The correction factor C may be calculated using a look-up table.

During the calculation of definition DD, a summation of the absolute value of higher frequency components does not have to be calculated for all minimum coded units in an image. In this case, a summation of the absolute value of higher frequency components may be calculated for minimum coded units which are uniformly spaced within an image. This reduces the operand so that the load of the DSP 124 is reduced.

In calculating the definition, the summation of the absolute value of higher frequency components may be calculated by summing components in a column or a row which has the biggest number of higher frequency components.

In calculating the definition, a summation of the absolute value of higher frequency components may be calculated by summing components in at least one of a column or a row. For example, a column could be v8, and a row could be h8 in FIG. 3. This reduces the operand so that the calculating time is reduced.

Moreover, in addition to Y-components, U-components (Cb-components) and V-components (Cr-components) may be also processed by a DCT, or U-components or V-components may be also processed by a DCT. The definition is calculated by a summation of processed Y-components, U-components, and V-components. In this case, the definition is more accurate than processing only Y-components.

Moreover, the memory medium 130 may be a detachable memory card, or any storage medium provided in a digital camera.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2006-202929 (filed on Jul. 26, 2006), which is expressly incorporated herein, by reference, in its entirety.

The invention claimed is:

1. An image capturing apparatus comprising:
   an image capturing device that outputs a captured image;
   an image compressing device that compresses the captured image using flexible compression;
   a recording device that records the compressed captured image into a memory medium;
   a definition calculating device that calculates a definition by summing the absolute value of higher frequency components in the compressed captured image before the higher frequency components are rounded off; and
   a residual recordable number calculating device that calculates a residual recordable number of images in the memory medium using the definition of a standard image, the file size of a standard image, and a residual recordable amount of the memory medium.

2. The image capturing apparatus according to claim 1, wherein said residual recordable number calculating device has a first value which equals the definition of a standard image divided by the definition of a compressed captured image and a second value which equals the residual recordable amount of the memory medium divided by the file size of a standard image, and calculates the residual recordable number of images by multiplying a first value by a second value.

3. The image capturing apparatus according to claim 1, wherein said image compressing device processes the captured image using an orthogonal transform, and then rounds off higher frequency components in the processed captured image.

4. The image capturing apparatus according to claim 3, wherein the orthogonal transform is a discrete cosine transform.

5. The image capturing apparatus according to claim 3, wherein Y-components in the processed captured image are processed by the orthogonal transform.

6. The image capturing apparatus according to claim 1, wherein the summation of the absolute value of higher frequency components is calculated by summing components in at least one of a column or a row which has the biggest number of higher frequency component.

7. The image capturing apparatus according to claim 1, further comprising a recordable number display that displays the residual recordable number of images.

8. The image capturing apparatus according to claim 7 further comprising an image display that displays the captured image, and updates the captured image periodically, and said recordable number display of images updating the residual recordable number of images periodically according to the updating of the captured image.

9. The image capturing apparatus according to claim 8, wherein said recordable number display updates the residual recordable number of images each time the captured image is updated.

10. The image capturing apparatus according to claim 8, wherein said recordable number display updates the residual recordable number of images in several times that an image is updated.

11. The image capturing apparatus according to claim 8, wherein said recordable number display and said image display comprise a display.

12. A digital camera comprising said image capturing apparatus according to claim 1, wherein said image capturing apparatus further comprises an auto-focus device that focuses a lens on a photographing object automatically, and said recordable number display updating the residual recordable number of images when said auto-focus device focuses the lens on a photographing object.

13. A digital camera comprising said image capturing apparatus according to claim 1, wherein a definition calculating device calculates a definition by summing the definitions of minimum coded units in the compressed captured image before the higher frequency components are rounded off.

14. The image capturing apparatus according to claim 1, wherein said residual recordable number calculating device has a correction factor which is a ratio of the definition of a compressed captured image to the definition of a standard image, and calculates the residual recordable number of images by dividing the residual recordable amount of the memory medium by the file size of a standard image, using the correction factor.

* * * * *